United States Patent
Liang et al.

(10) Patent No.: US 11,479,671 B2
(45) Date of Patent: Oct. 25, 2022

(54) TRANSPARENT ROLLABLE FOLDED POLYSILOXANE FILM AND PREPARATION AND SELF-REPAIRING METHOD THEREOF

(71) Applicant: SOOCHOW UNIVERSITY, Suzhou (CN)

(72) Inventors: Guozheng Liang, Suzhou (CN); Youhao Zhang, Suzhou (CN); Aijuan Gu, Suzhou (CN); Li Yuan, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 426 days.

(21) Appl. No.: 16/759,328

(22) PCT Filed: Jul. 4, 2018

(86) PCT No.: PCT/CN2018/094572
§ 371 (c)(1),
(2) Date: Apr. 25, 2020

(87) PCT Pub. No.: WO2020/006720
PCT Pub. Date: Jan. 9, 2020

(65) Prior Publication Data
US 2020/0308407 A1 Oct. 1, 2020

(51) Int. Cl.
*C08L 83/08* (2006.01)
*C08J 5/18* (2006.01)
*B29C 71/02* (2006.01)
*C08L 75/02* (2006.01)

(52) U.S. Cl.
CPC .............. *C08L 83/08* (2013.01); *C08J 5/18* (2013.01); *C08J 7/08* (2013.01); *C08L 75/02* (2013.01); *C08J 2375/02* (2013.01); *C08J 2383/08* (2013.01); *C08J 2475/02* (2013.01); *C08J 2483/08* (2013.01); *C08L 2201/10* (2013.01)

(58) Field of Classification Search
None
See application file for complete search history.

(56) References Cited

FOREIGN PATENT DOCUMENTS

| CN | 104140675 A | 11/2014 | |
|---|---|---|---|
| CN | 105400405 A | 3/2016 | |
| CN | 105482065 A * | 4/2016 | ............ C08G 18/66 |
| CN | 106928797 A | 7/2017 | |
| CN | 107082862 A | 8/2017 | |
| CN | 107814937 A | 3/2018 | |
| CN | 108003317 A | 5/2018 | |
| CN | 108102531 A | 6/2018 | |
| CN | 108794781 A | 11/2018 | |
| WO | 2018108950 A1 | 6/2018 | |

OTHER PUBLICATIONS

Wu, Xinxiu, et al. "Heat-triggered poly (siloxane-urethane) s based on disulfide bonds for self-healing application." Journal of Applied Polymer Science 135.31 (2018): 46532. (Year: 2018).*
Machine translation of CN-105482065, translation generated Aug. 2022, 12 pages. (Year: 2022).*

* cited by examiner

*Primary Examiner* — Robert S Loewe
(74) *Attorney, Agent, or Firm* — SZDC Law P.C.

(57) ABSTRACT

This invention provides a scrollable and foldable transparent polysiloxane film and its preparation and self-healing method. 2-Hydroxyethyl disulfide, diisocyanate and alkane chloride were mixed and reacted to get disulfide-containing diisocyanate. α,ω-Aminopropyl terminated polydimethylsiloxane, diisocyanate and alkane chloride were mixed and reacted get linear chain-extended polydimethylsiloxane. Linear chain-extended polydimethylsiloxane, multi-amino terminated hyperbranched polysiloxane, disulfide-containing diisocyanate and alkane chloride were mixed and poured into a mould. After drying, the scrollable and foldable transparent polysiloxane film was obtained. The polysiloxane film described in this invention are constructed by dynamic physical crosslinking induced by hydrogen bond and permanent chemical crosslinking generated by hyperbranched polysiloxane. Hence, the polysiloxane film achieves both high stiffness and toughness. The good self-healing behavior of the polysiloxane films is originated from the temperature controlled dissociation of hydrogen bonds and exchange reaction rate of disulfide bonds.

12 Claims, 5 Drawing Sheets

TRANSPARENT ROLLABLE FOLDED POLYSILOXANE FILM AND PREPARATION AND SELF-REPAIRING METHOD THEREOF

This application is the National Stage Application PCT/CN2018/094572, filed on Jul. 4, 2018, which is incorporated by reference for all purposes as if fully set forth herein.

TECHNICAL FIELD

This invention relates to a polymeric film and its preparation method. In a particular aspect, the invention relates to a scrollable and foldable transparent polysiloxane film and its preparation and self-healing method. It belongs to technical fields of polymeric materials.

BACKGROUND OF THE INVENTION

With the rapid development of transparent optoelectronic devices, such as flexible electrodes, solar cells, sensors, displays, electronic skins, and flexible printed circuit boards (FPCBs), etc., flexible electronics with high transparency are drawing tremendous attention of scientists and engineers. Most conventional organic electronic devices generally have several layers and components that are integral to the function and performance of the device, which are typically comprised of a substrate (i.e. silicon, glass or plastic), dielectric, semiconductor (or the active component) and conductive electrodes. The organic electronic devices with silicon or glass substrates are usually so rigid that they could not be bent freely. Therefore, at present, flexible electronic devices are mainly manufactured by deposition of functional layers and components onto commercial plastic substrates, such as polyimide (PI) or polyethylene terephthalate (PET).

On the other hand, as conventional electronics, flexible transparent electronic devices also have a tough problem on guaranteeing the service life, because the mechanical damage caused by excess bending, accidental cutting or scratching has proved to be a major reason for greatly shortening the lifespan of flexible electronic devices. In recent years, lots of efforts have been carried out to prevent materials from mechanical damages through a strategy similar to bio-inspired self-healing. However, the self-healing ability of commercial PI or PET films for flexible electronic devices is not ideal to repair cracks or even fractures. What's more, the tendency of miniaturization and portability also presents harsh requirements on scrollability and foldability for electronic devices. Obviously, these hard facts ask for new high performance flexible films for electronic devices.

In current researches, the terminals of polydimethylsiloxane (PDMS) were modified with pyridine or triazole, and they subsequently form dynamic coordination complex with metallic ions such as $Co^{2+}$, $Fe^{3+}$ and $Zn^{2+}$. These obtained PDMS elastomers usually possess extremely high elongation at break (up to 10000%), and their healing efficiencies can reach above 90% at room temperature, so they exhibit great potential as substrates in wearable sensors, electronic skins and artificial muscles. However, these self-healable and highly stretchable PDMS-based materials are not adaptable for fabricating solar cells, flexible displays, capacitive touch screens and FPCBs, etc., due to relatively low stiffness and mechanical strength. One exceptional example is the pioneer work conducted by Li's group. They gave the first report on developing a stiff PDMS network by introducing triple functional boroxine as the crosslinker, which has the highest Young's modulus (182 MPa) and tensile strength (9.46 MPa) among PDMS-based self-healable systems; while its self-healing process should be triggered with water, so it is not suitable for electronic devices due to the threat of circuit shortage caused by water leakage.

Therefore, it is still an interesting issue with great challenge to develop novel self-healable films with high visible light transparency, superior mechanical strength and toughness as a scrollable and foldable matrix for flexible transparent electronics.

Technical Problem

Solution

Technical Solutions

In order to overcome the disadvantages of technology on existing flexible polysiloxane films, this invention provides a new kind of scrollable and foldable transparent polysiloxane films and their preparation and self-healing method, which could be extensively used owing to its good flexibility, high transparency, low cost and ease of large-scale fabrication. Compared with C—C bonds, Si—O bonds have larger bond length and bond angle, and thus are easier to achieve internal rotation and corresponding segmental motion; this feature exactly coincides with the requirements of high chain mobility for self-healable materials. Hence, flexible transparent electronic devices based on polysiloxane have been reported showing high stretchability and self-healing ability.

In order to achieve above purpose, the technical solution adopted by this invention is providing a method of preparing a scrollable and foldable transparent polysiloxane film, which is composed of following steps:

(1) γ-Aminopropyltriethoxysilane, water and alcohol solvent were mixed and reacted to get multi-amino terminated hyperbranched polysiloxane, (2) 2-Hydroxyethyl disulfide, diisocyanate and alkane chloride were mixed and reacted to get disulfide-containing diisocyanate, (3) α,ω-Aminopropyl terminated polydimethylsiloxane, diisocyanate and alkane chloride were mixed and reacted to get linear chain-extended polydimethylsiloxane, (4) Linear chain-extended polydimethylsiloxane, multi-amino terminated hyperbranched polysiloxane, disulfide-containing diisocyanate and alkane chloride were mixed and poured into a mould. After drying, a scrollable and foldable transparent polysiloxane film was obtained.

This invention provides a method of self-healing a damaged scrollable and foldable transparent polysiloxane film, which is composed of following steps: fractured surfaces of damaged scrollable and foldable transparent polysiloxane films were brought into contact and maintained at 100 to 140° C. for 0.5 to 2 h to fulfill their self-healing process. The preparation method of above-mentioned scrollable and foldable transparent polysiloxane films is composed of following steps:

(1) γ-Aminopropyltriethoxysilane, water and alcohol solvent were mixed and reacted to get multi-amino terminated hyperbranched polysiloxane, (2) 2-Hydroxyethyl disulfide, diisocyanate and alkane chloride were mixed and reacted to get disulfide-containing diisocyanate, (3) α,ω-Aminopropyl terminated polydimethylsiloxane, diisocyanate and alkane chloride were mixed and reacted to get linear chain-extended polydimethylsiloxane, (4) Linear chain-extended polydimethylsiloxane, multi-amino terminated hyperbranched polysiloxane, disulfide-containing diisocyanate and alkane chloride were mixed and poured into a mould. After drying, a kind of scrollable and foldable transparent polysiloxane films was obtained.

This invention provides the application of multi-amino terminated hyperbranched polysiloxane, disulfide-containing diisocyanate and linear chain-extended polydimethylsiloxane in preparation of scrollable and foldable transparent polysiloxane films, which features the preparation methods of multi-amino terminated hyperbranched polysiloxane, disulfide-containing diisocyanate and linear chain-extended polydimethylsiloxane that is composed of following steps:

γ-Aminopropyltriethoxysilane, water and alcohol solvent were mixed and reacted to get multi-amino terminated hyperbranched polysiloxane.

2-Hydroxyethyl disulfide, diisocyanate and alkane chloride were mixed and reacted to get disulfide-containing diisocyanate.

α,ω-Aminopropyl terminated polydimethylsiloxane, diisocyanate and alkane chloride were mixed and reacted to get linear chain-extended polydimethylsiloxane.

The preparation method of scrollable and foldable transparent polysiloxane films with multi-amino terminated hyperbranched polysiloxane, disulfide-containing diisocyanate and linear chain-extended polydimethylsiloxane is composed of following steps: linear chain-extended polydimethylsiloxane, multi-amino terminated hyperbranched polysiloxane, disulfide-containing diisocyanate and alkane chloride were mixed and poured into a mould. After drying, a kind of scrollable and foldable transparent polysiloxane films was obtained.

The alcohol solvent described in above-mentioned technical solution is methanol, ethanol, n-propanol, isopropanol, n-butanol, isobutanol, or any combination thereof. The alkane chloride described in above-mentioned technical solution is dichloromethane, trichloromethane, 1,2-dichloroethane, or any combination thereof. The diisocyanate described in above-mentioned technical solution is diisocyanate compounds or any derivatives prepared from diisocyanate compounds. The diisocyanate compounds described in above-mentioned technical solution is 2,4-tolylene diisocyanate (TDI), isophorone diisocyanate (IPDI), 4,4'-diphenylmethane diisocyanate (MDI), 4,4'-dicyclohexylmethane diisocyanate (HMDI), hexamethylene diisocyanate (HDI), lysine diisocyanate (LDI), xylylene diisocyanate (XDI), 1,5-naphthalene diisocyanate (NDI), 1,3-bis(1-isocyanato-1-methylethyl)benzene (TMXDI), 4-methylcyclohexyl diisocyanate (HTDI), or any combination thereof. The preferred molecular weight of α,ω-Aminopropyl terminated polydimethylsiloxane is 1000.

The mass ratio of γ-Aminopropyltriethoxysilane, water and alcohol solvent in Step (1) of above-mentioned technical solutions is 100:(10 to 15):(100 to 200). The mass ratio of 2-hydroxyethyl disulfide, diisocyanate and alkane chloride in Step (2) of above-mentioned technical solutions is (75 to 80):(160 to 270):(1000 to 1500). The mass ratio of α,ω-aminopropyl terminated polydimethylsiloxane, diisocyanate and alkane chloride in Step (3) of above-mentioned technical solutions is 100:(10 to 25):(1000 to 1500). The mass ratio of linear chain-extended polydimethylsiloxane, multi-amino terminated hyperbranched polysiloxane, disulfide-containing diisocyanate and alkane chloride in Step (4) of above-mentioned technical solutions is 50:(3 to 6):(10 to 15):(100 to 150).

In the Step (1) of above-mentioned technical solutions, the mixture temperature is room temperature and the reaction temperature is 60 to 80° C. and the reaction time is 4 to 6 h. In the Step (2) of above-mentioned technical solutions, the mixture temperature is room temperature and the reaction temperature is 60 to 80° C. and the reaction time is 2 to 4 h. In the Step (3) of above-mentioned technical solutions, the mixture temperature is room temperature and the reaction temperature is 60 to 80° C. and the reaction time is 4 to 6 h. In the Step (4) of above-mentioned technical solutions, the mixture temperature is room temperature. The room temperature of above-mentioned technical solutions refers to the indoor temperature and the preferred temperature is 20 to 30° C.

In the Step (1) of above-mentioned technical solutions, multi-amino terminated hyperbranched polysiloxane is obtained by removing solvents under reduced pressure after the reaction is complete. In the Step (2) of above-mentioned technical solutions, disulfide-containing diisocyanate is obtained by removing solvents under reduced pressure after the reaction is complete. In the Step (3) of above-mentioned technical solutions, linear chain-extended polydimethylsiloxane is obtained by removing solvents under reduced pressure after the reaction is complete.

In the above-mentioned technical solutions, damage refers to fracture, and the fractured surfaces are brought into contact and held tightly by clamps to conduct self-healing process under heating.

The scrollable and foldable transparent polysiloxane films prepared by the above-mentioned preparation method.

The invention provides the specific preparation method of a kind of scrollable and foldable transparent polysiloxane films, which is composed of following steps:

(1) By mass, at 20 to 30° C., 100 parts of γ-aminopropyltriethoxysilane, 10 to 15 parts of water and 100 to 200 parts of alcohol solvent were mixed homogeneously; the mixture was heated to 60 to 80° C. and continued to react for 4 to 6 h; the alcohol solvent was removed under reduced pressure to get multi-amino terminated hyperbranched polysiloxane, (2) By mass, at 20 to 30° C., 77 parts of 2-hydroxyethyl disulfide, 169 to 264 parts of diisocyanate and 1000 to 1500 parts of alkane chloride were mixed homogeneously; the mixture was heated to 60 to 80° C. and continued to react for 2 to 4 h; the alkane chloride was removed under reduce pressure to get disulfide-containing diisocyanate, (3) By mass, at 20 to 30° C., 100 parts of α,ω-aminopropyl terminated polydimethylsiloxane (PDMS, $M_n$=1000), 13 to 21 parts of diisocyanate and 1000 to 1500 parts of alkane chloride were mixed homogeneously; the mixture was heated to 60 to 80° C. and continued to react for 2 to 4 h; the alkane chloride was removed under reduced pressure to get linear chain-extended polydimethylsiloxane, (4) By mass, at 20 to 30° C., 50 parts of linear chain-extended polydimethylsiloxane, 3 to 6 parts of multi-amino terminated hyperbranched polysiloxane, 10 to 15 parts of disulfide-containing diisocyanate and 100 to 150 parts of alkane chloride were mixed homogeneously and poured into a mould. After drying, a kind of scrollable and foldable transparent polysiloxane films was obtained.

The Beneficial Effects of the Invention

Beneficial Effects

Compared with the existed technical solutions, this invention achieves following beneficial effects:

1. The polysiloxane films described in this invention are constructed by hierarchical crosslinked network including dynamic physical crosslinking induced by hydrogen bond and permanent chemical crosslinking generated by hyperbranched polysiloxane. Hence, these polysiloxane films have high modulus, tensile strength, glass transition temperature and toughness.

2. The self-healing behavior of the polysiloxane films with both high stiffness and strength described in this invention is originated from the temperature controlled association/dissociation of hydrogen bonds and exchange reaction rate of disulfide bonds, of which self-healing efficiency (>90%) is comparable to current existed polysiloxane elastomers.

3. Compared with existed technical solutions, the polysiloxane films described in this invention achieve high stiffness; simultaneously, they can be reversibly bent, folded and scrolled for many times without crease left.

EXAMPLES OF THE INVENTION

The technical solutions of this invention will be further described below with the accompanying figures and examples.

Example 1

1) Synthesis of Multi-Amino Terminated Hyperbranched Polysiloxane (HPSi)

Figure 1:
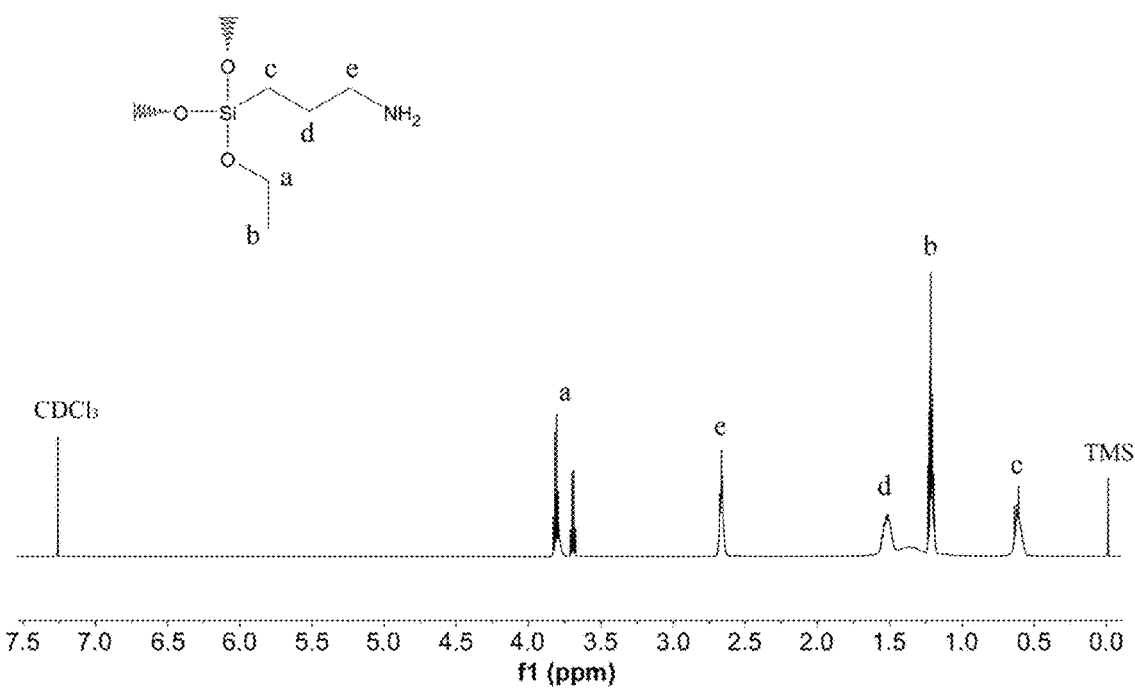
FIG. 1 is $^1$H-NMR spectrum of multi-amino terminated hyperbranched polysiloxane (HPSi) synthesized in Example 1 of this invention.
Figure 2:
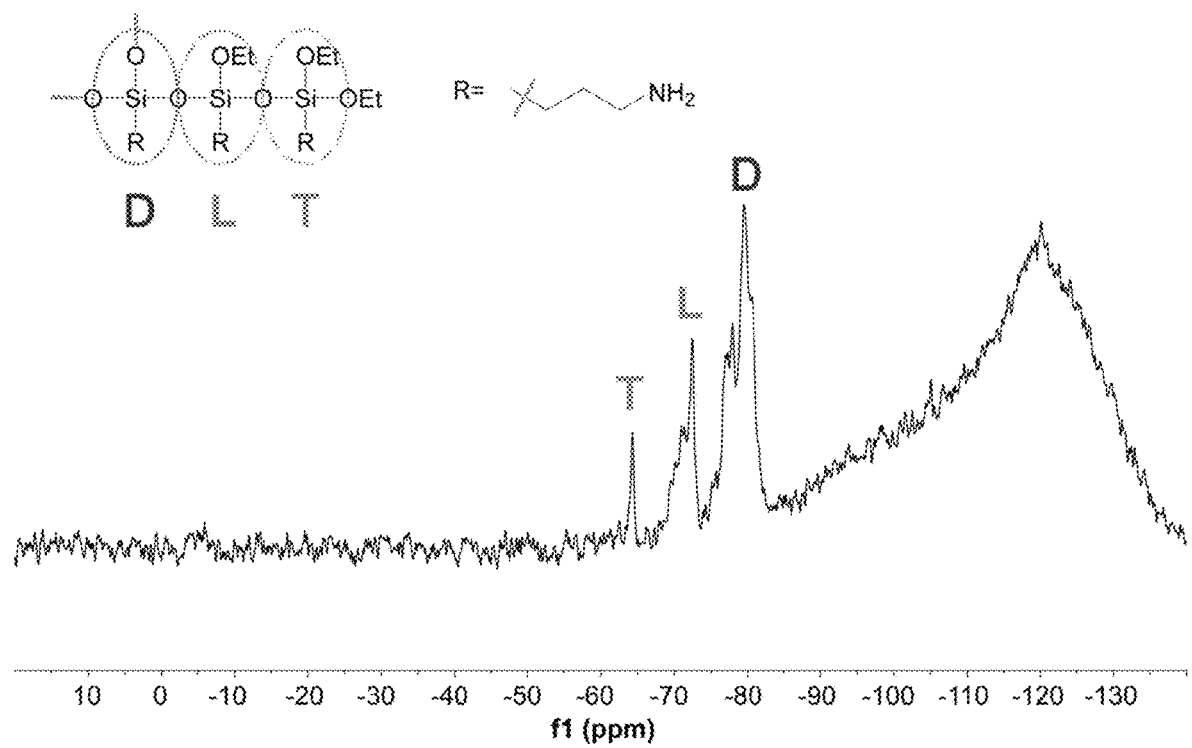
FIG. 2 is $^{29}$Si-NMR spectrum of multi-amino terminated hyperbranched polysiloxane (HPSi) synthesized in Example 1 of this invention.

By mass, at 20° C., 100 g γ-aminopropyltriethoxysilane (KH550), 10 g water and 100 g ethanol were mixed homogeneously; the mixture was heated to 60° C. and continued to react for 4 h; ethanol was removed under reduced pressure to get multi-amino terminated hyperbranched polysiloxane (HPSi). $^1$H-NMR and $^{29}$Si-NMR spectra of HPSi are shown in FIG. 1 and FIG. 2, respectively.

2) Synthesis of Disulfide-Containing Diisocyanate

Figure 3:
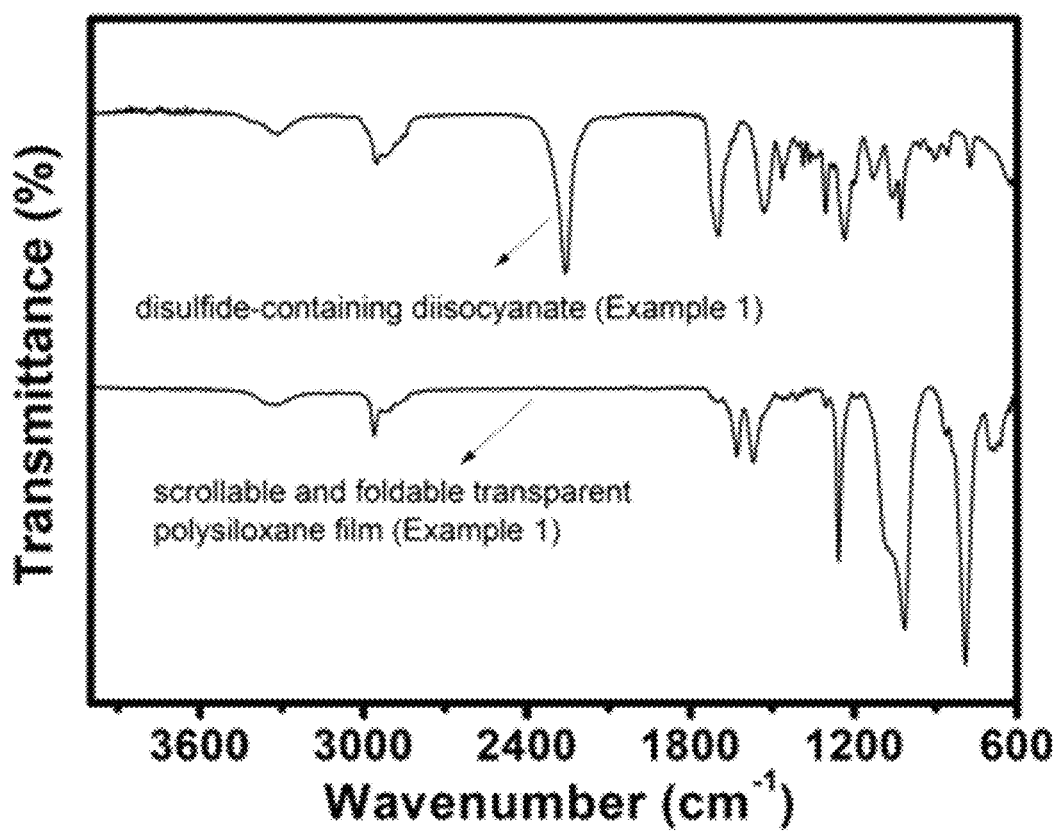
FIG. 3 is Fourier transform infrared (FTIR) spectra of disulfide-containing diisocyanate and scrollable and foldable transparent polysiloxane films synthesized in Example 1 of this invention.

By mass, at 20° C., 77 g 2-hydroxyethyl disulfide, 224 g isophorone diisocyanate and 1000 g dichloromethane were mixed homogeneously; the mixture was heated to 60° C. and continued to react for 2 h; dichloromethane was removed under reduce pressure to get disulfide-containing diisocyanate. FTIR spectrum of disulfide-containing diisocyanate is shown in FIG. 3.

3) Synthesis of Linear Chain-Extended Polydimethylsiloxane

By mass, at 20° C., 100 g α,ω-aminopropyl terminated polydimethylsiloxane (PDMS, $M_n$=1000), 17.7 g isophorone diisocyanate and 1000 g dichloromethane were mixed homogeneously; the mixture was heated to 60° C. and continued to react for 2 h; dichloromethane was removed under reduced pressure to get linear chain-extended polydimethylsiloxane.

4) Synthesis of Scrollable And Foldable Transparent Polysiloxane Films

By mass, at 20° C., 50 g linear chain-extended polydimethylsiloxane, 3.6 g multi-amino terminated hyperbranched polysiloxane, 10 g disulfide-containing diisocyanate and 100 g dichloromethane were mixed homogeneously and poured into a mould. After drying, scrollable and foldable transparent polysiloxane films were obtained. The FTIR spectra, TGA curves, DMA curves, digital images of scrolling and folding process, UV-vis spectra and tensile stress-strain curves of scrollable and foldable transparent polysiloxane films are shown in FIG. 3, FIG. 4, FIG. 5, FIG. 6, FIG. 7 and FIG. 8, respectively.

Figure 8:
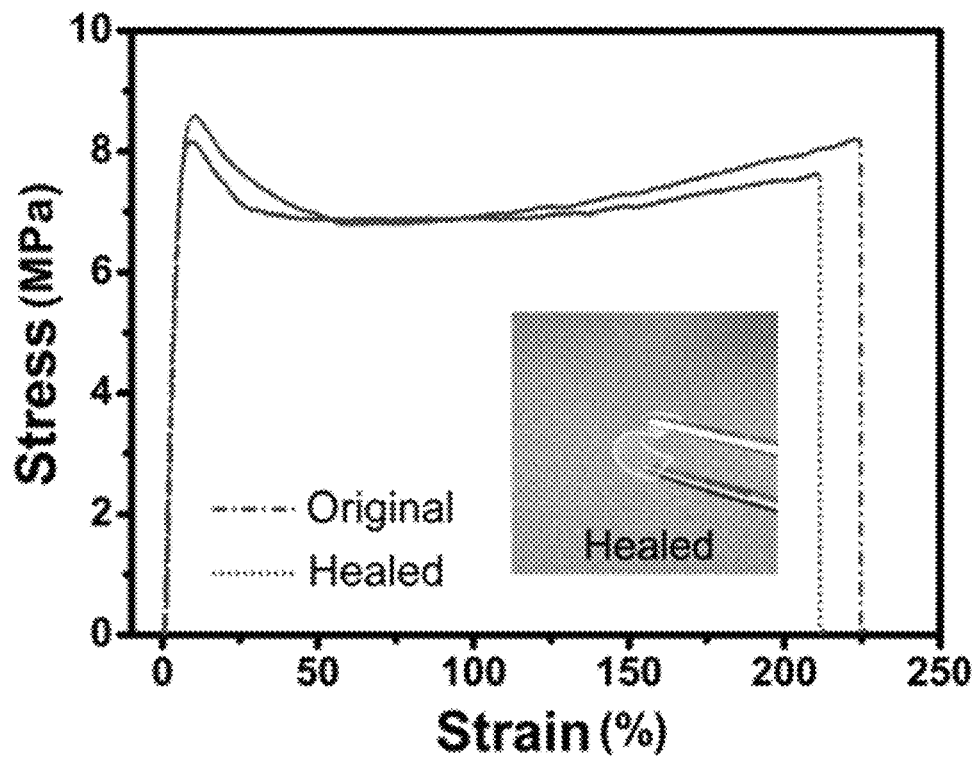
FIG. 8 is tensile stress-strain curves of original and self-healed scrollable and foldable transparent polysiloxane films synthesized in Example 1 of this invention.
Figure 9:
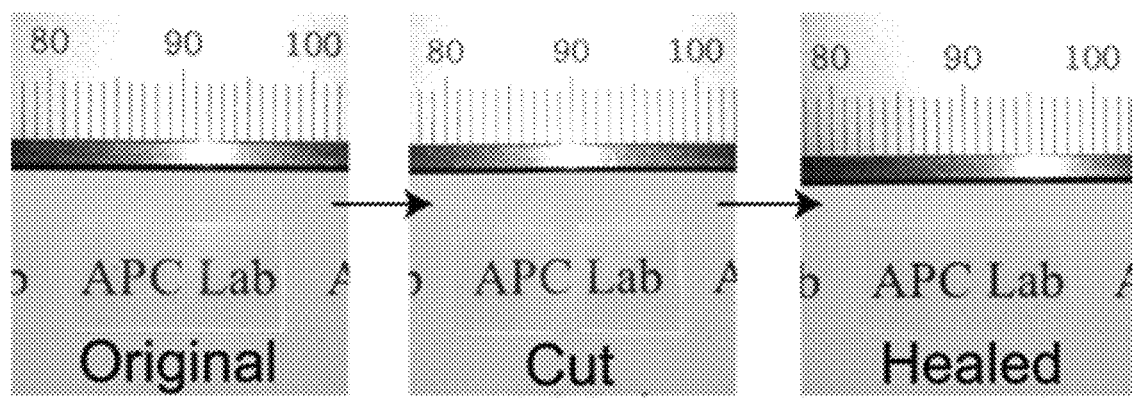
FIG. 9 is digital images of self-healing process of scrollable and foldable transparent polysiloxane films synthesized in Example 1 of this invention.
Figure 10:
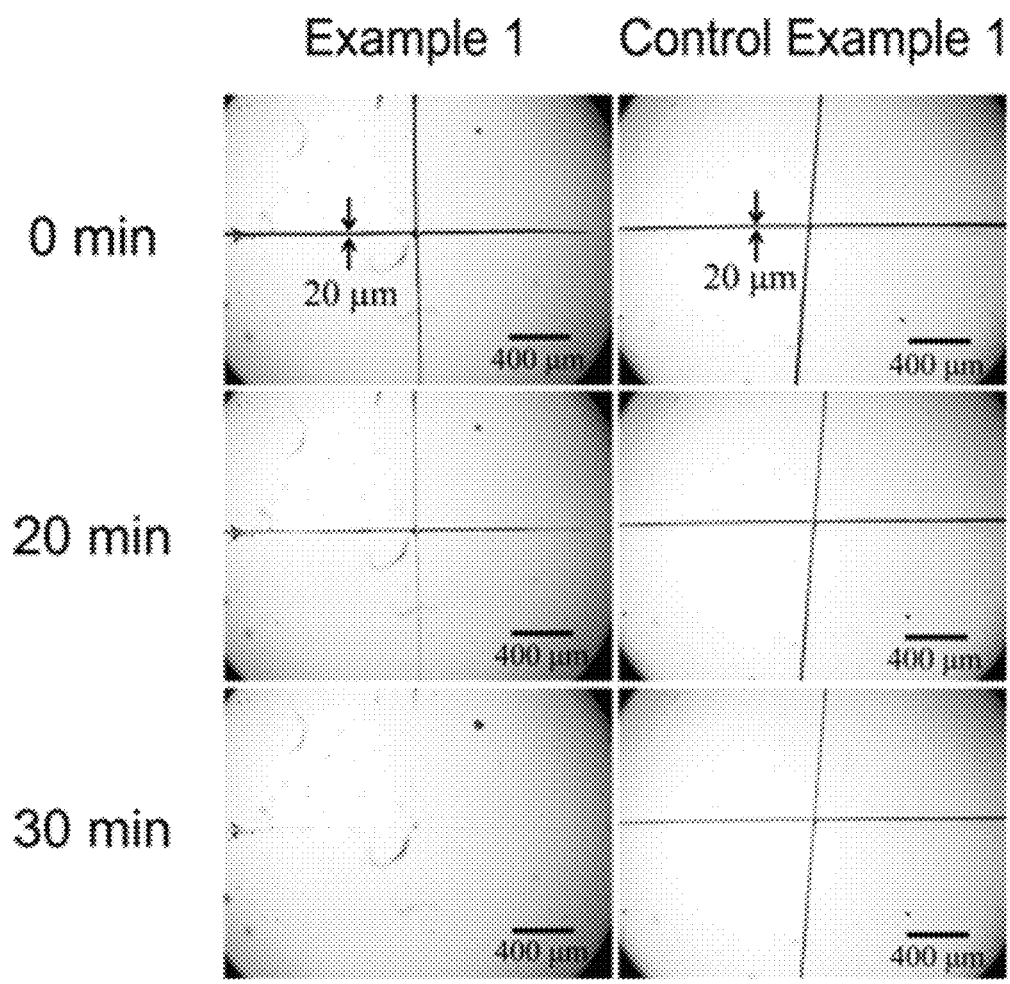
FIG. 10 is polarized optical microscope (POM) images of self-healing process of scrollable and foldable transparent polysiloxane films synthesized in Example 1 and polysiloxane films without disulfide synthesized in Control Example 1 of this invention.

5) Self-Healing Method of Scrollable And Foldable Transparent Polysiloxane Films Fractured surfaces of damaged scrollable and foldable transparent polysiloxane films were brought into contact, held tightly by clamps, and maintained at 100° C. for 0.5 h to fulfill the self-healing process. The tensile stress-strain curves, digital images of self-healing process, polarized optical microscope (POM) images of self-healing process of self-healed scrollable and foldable transparent polysiloxane films are shown in FIG. 8, FIG. 9 and FIG. 10, respectively.

Control Example 1 Synthesis of Polysiloxane Films Without Disulfide

By mass, at 20° C., 50 g linear chain-extended polydimethylsiloxane, 3.6 g multi-amino terminated hyperbranched polysiloxane, 4 g isophorone diisocyanate and 100 g dichloromethane were mixed homogeneously and poured into a mould. After drying, polysiloxane films without disulfide were obtained.

Fractured surfaces of damaged polysiloxane films without disulfide were brought into contact, held tightly by clamps, and maintained at 100° C. for 0.5 h to fulfill the self-healing process.

The POM images of self-healing process of polysiloxane films without disulfide described in Control example 1 are shown in FIG. 10.

FIG. 1 gives the $^1$H-NMR spectrum of multi-amino terminated hyperbranched polysiloxane prepared in Example 1. The characteristic signals at 1.21 ppm (b) represent methyl protons of ethoxy group. It could be deduced that the integration ratio of these methyl protons (b) to methylene protons of aminopropyl (c, d or e) is 1.5, which is much lower than the theoretical value (4.5) calculated from the stoichiometric ratio of KH550. This result reveals that ethoxy groups have been hydrolyzed and condensed to siloxane linkages.

FIG. 2 gives the $^{29}$Si-NMR spectrum of multi-amino terminated hyperbranched polysiloxane prepared in Example 1. The three characteristic signals at −64.3, −72.5 and −79.5 ppm are assigned to terminal units (T), linear units (L) and dendritic units (D), respectively. It is observed that the signal at −79.5 ppm is much more pronounced than other two signals, suggesting that dendritic units exist in HPSi, and KH550 has been completely hydrolysed. Degree of branching (DB) is an important parameter to describe the level of similarity between branching structures of hyperbranched polymers and common dendrimers, which is often determined by the integral areas of $^{29}$Si-NMR spectrum according to Frey's equation (Eqn 1).

$$DB = \frac{2D}{2D + L} \quad (1)$$

DB of HPSi is calculated to be 0.86, close to the value of perfect dendrimers (DB=1), and is likely to resemble a completely branched structure. It means that HPSi possesses better solubility, lower viscosity and more highly reactive terminal aminos than linear analog.

FIG. 3 gives the FTIR spectra of disulfide-containing diisocyanate and scrollable and foldable transparent polysiloxane films prepared in Example 1. After 2-hydroxyethyl disulfide is reacted with isophorone diisocyanate, the generation of urethane group results in the appearance of stretching vibration at 1720 cm$^{-1}$ of carbonyl, and the characteristic peak of —NCO appears at 2260 cm$^{-1}$.

The appearance of the stretching (3318 cm$^{-1}$) and bending (1560 cm$^{-1}$) vibrations of secondary amino as well as the stretching vibration of carbonyl in urea (1630 cm$^{-1}$) indicate the occurrence of the chain-extension of PDMS and subsequent reactions between disulfide-containing diisocyante and linear chain-extended polydimethylsiloxane or HPSi. The stretching and bending vibrations of methyl groups in PDMS and isophorone are located at 2960 cm$^{-1}$ and 1260 cm$^{-1}$, respectively. The sharp characteristic peak at 800 cm$^{-1}$, and the broad stretching vibration between 1080 and 1025 cm$^{-1}$ severally represent Si—C and Si—O in PDMS or HPSi. No obvious vibration assigned to —NCO (2260 cm$^{-1}$) is found in the spectrum of films, so disulfide-containing diisocyante has thoroughly reacted with linear chain-extended polydimethylsiloxane or HPSi, and no isocyanate remains in films.

Figure 4:
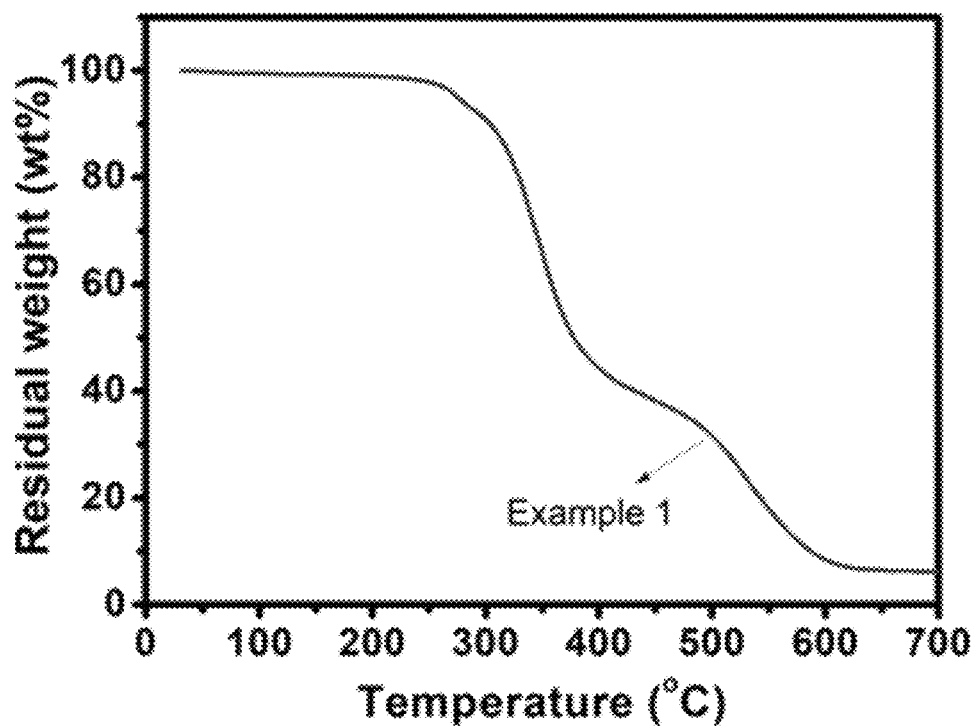
FIG. 4 is thermogravimetric analysis (TGA) curves of scrollable and foldable transparent polysiloxane films synthesized in Example 1 of this invention.

FIG. 4 gives the TGA curves of scrollable and foldable transparent polysiloxane films prepared in Example 1 and the initial decomposition temperature ($T_{di}$) is 282° C., indicating good thermal stability.

Figure 5:
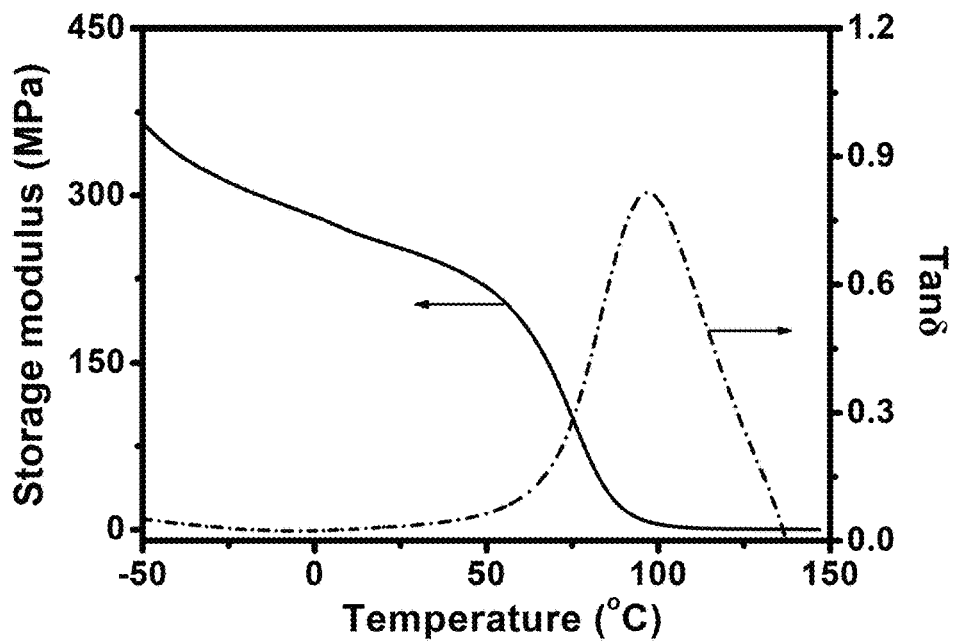
FIG. 5 is dynamic mechanical analysis (DMA) curves of scrollable and foldable transparent polysiloxane films synthesized in Example 1 of this invention.

FIG. 5 gives the DMA curves of scrollable and foldable transparent polysiloxane films prepared in Example 1. The tan δ-temperature curve has a symmetric pattern and its single peak value is regarded as glass transition temperature ($T_g$). Hence, the $T_g$ of scrollable and foldable transparent polysiloxane films in Example 1 is 96° C., higher than that of currently existed self-healable polysiloxane resins (−120 to 65° C.).

Figure 6:
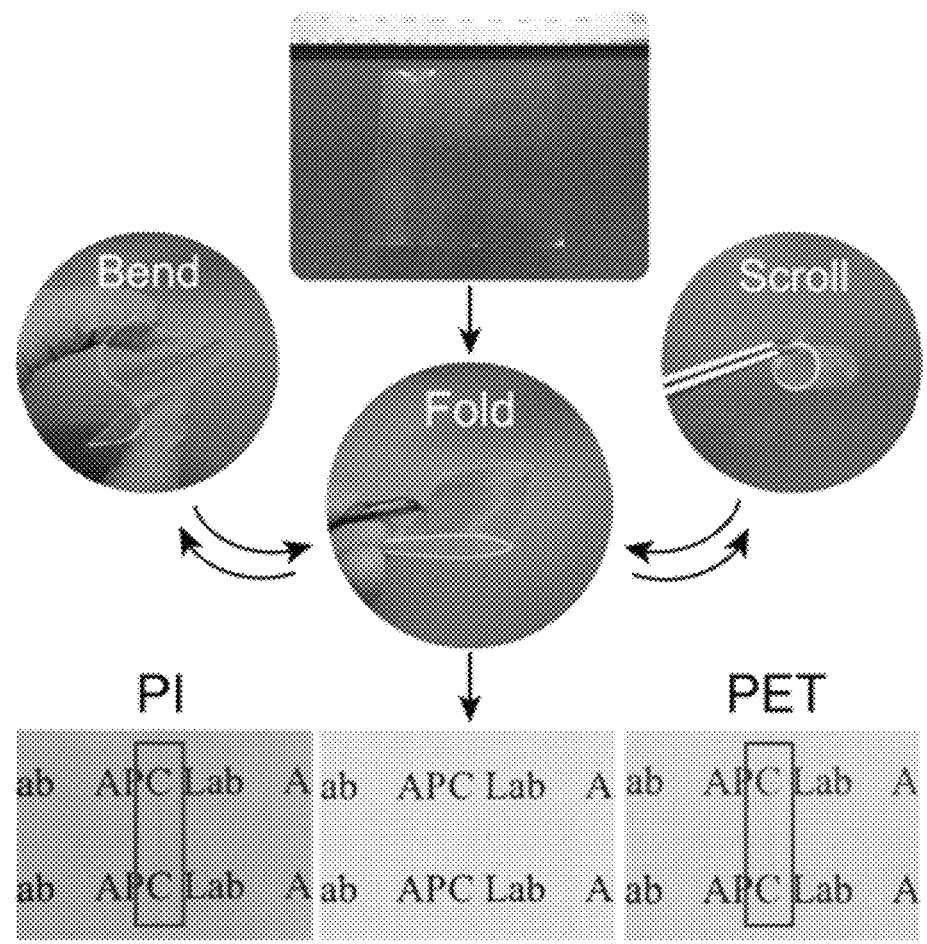
FIG. 6 is digital images of scrolling and folding process of scrollable and foldable transparent polysiloxane films synthesized in Example 1 of this invention.

FIG. 6 gives digital images of scrolling and folding process of scrollable and foldable transparent polysiloxane films prepared in Example 1. A square scrollable and foldable transparent polysiloxane film with dimensions of 60 mm×60 mm was tailored, which can be reversibly changed from one shape to another among three shapes including folding, bending and scrolling, meaning its outstanding flexibility. PI and PET films with same dimensions were taken as references, and also reversibly folded twice. After that, there is a non-recoverable crease left on the surface of either PI film or PET film, while the crease on PI film is transparent but the crease on PET film is an obvious white trace which makes the letter "C" of the background paper not perfect to be shown. In contrast, the folded area of scrollable and foldable transparent polysiloxane film keeps transparent without obvious crease left, and the printed words are clear to be identified, meaning that this novel scrollable and foldable transparent polysiloxane film is able to overcome the disadvantages of PI and PET.

Figure 7:
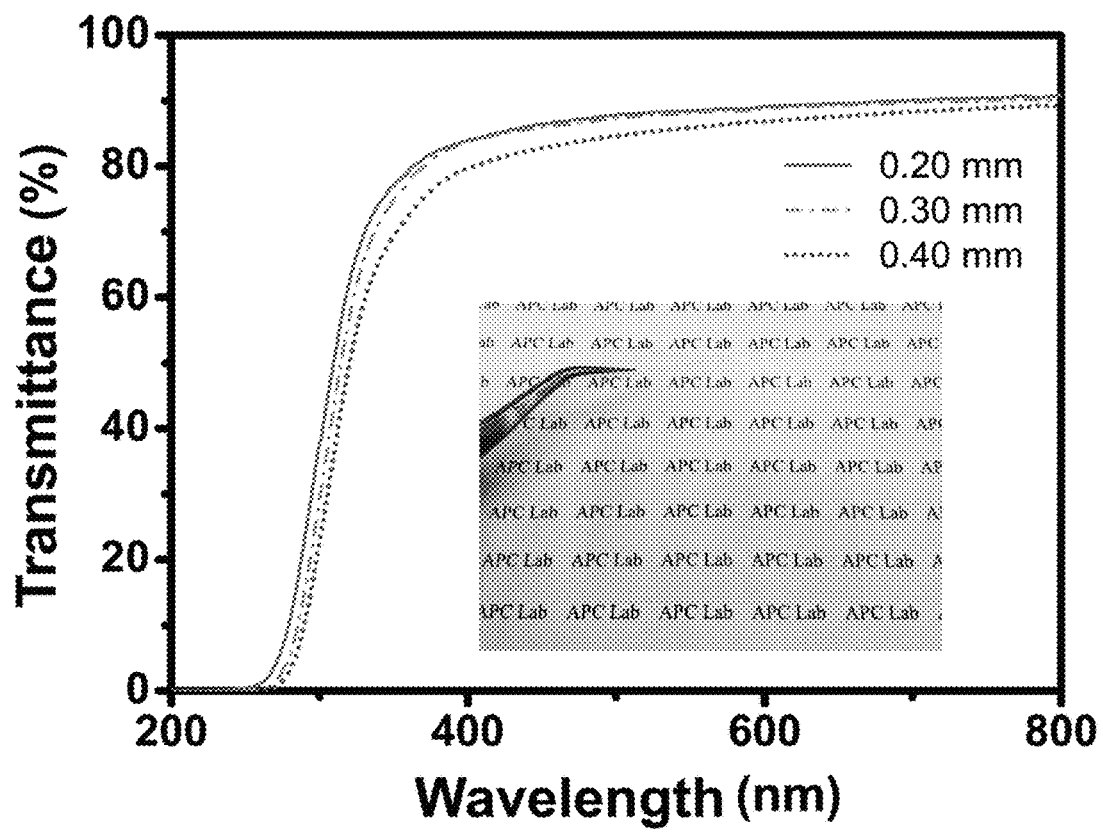
FIG. 7 is UV-vis spectra of scrollable and foldable transparent polysiloxane films synthesized in Example 1 of this invention.

FIG. 7 gives the UV-vis spectra of scrollable and foldable transparent polysiloxane films prepared in Example 1. From the digital photo (inset of FIG. 7), it can be directly seen that the film has good transparency. According to UV-vis spectra, the transmittances with different thicknesses are all larger than 80% within the visible region. Specially, the transmittance at 550 nm is increased from 86.09% (0.4 mm thickness) to 88.63% (0.2 mm thickness), which is consistent with the digital photo.

FIG. 8 gives the tensile stress-strain curves of original and self-healed scrollable and foldable transparent polysiloxane films prepared in Example 1. The tensile strength, elongation at break, Young's modulus and toughness of original film are 9.25±0.22 MPa, 224.21±2.79%, 214.89±18.27 MPa and 16.32±0.18 MPa, respectively, suggesting good stiffness and toughness. The tensile strength, elongation at break and toughness of healed film are 8.16±0.87 MPa, 211.59±5.63% and 14.91±0.72 MPa, respectively. Hence, the corresponding healing efficiencies are 94.99%, 94.37% and 91.36%, respectively. The healed polysiloxane sample could bend 180 degrees without generating cracks on its surfaces (inset of FIG. 8), suggesting that the healed film has good integrity. The Young's modulus and tensile strength of scrollable and foldable transparent polysiloxane films described in this invention are superior to those of existed technical solutions, and the elongation at break value is 22.4 times larger than that of existed technical solutions, meaning that this kind of scrollable and foldable transparent polysiloxane films can simultaneously achieve excellent stiffness and toughness.

FIG. 9 gives digital images of self-healing process of scrollable and foldable transparent polysiloxane films prepared in Example 1. An intact film was cut into two pieces, and then brought into contact at the fractured surfaces. After maintained at 100° C. for 30 min on the heating stage, the two pieces of LP2-SS-HP fuse together as an integrity.

FIG. 10 gives the POM images of self-healing process of scrollable and foldable transparent polysiloxane films prepared in Example 1 and polysiloxane films without disulfide prepared in Control Example 1. The surface morphology of damaged scrollable and foldable transparent polysiloxane films was examined by direct observing the healing process using POM. Cross-shaped scratches, each of which has a width of 20 μm, were first cut using a scalpel on the surface of the sample (black regions in FIG. 10); then the sample was placed on a heating stage and maintained at 100° C. for different length of time to get self-healing. With the extension of healing time, the cross-shaped scratches gradually narrow and shallow, and the black regions turn semi-transparent. When the healing time reaches 30 min, these scratches are totally recovered without obvious scars. In contrast, the cross-shaped scratches of polysiloxane films without disulfide do not recover their transparency, and the black regions of scratches are still clearly shown with slightly reduced width under the same self-healing condition. Therefore, it is reasonable to state that the permanent chemical crosslinked network formed by HPSi can restrain the segmental motion of flexible PDMS. Although the dissociation of hydrogen bonds upon heating at 100° C. can partially recover the chain diffusion, the introduction of dynamic disulfide is the key factor for the self-healing ability of scrollable and foldable transparent polysiloxane films.

Example 2

1) Synthesis of Multi-Amino Terminated Hyperbranched Polysiloxane (HPSi)

By mass, at 25° C., 100 g γ-aminopropyltriethoxysilane (KH550), 12.5 g water and 150 g methanol were mixed homogeneously; the mixture was heated to 70° C. and continued to react for 5 h; methanol was removed under reduced pressure to get multi-amino terminated hyperbranched polysiloxane (HPSi).

2) Synthesis of Disulfide-Containing Diisocyanate

By mass, at 20° C., 77 g 2-hydroxyethyl disulfide, 169 g hexamethylene diisocyanate and 1100 g trichloromethane were mixed homogeneously; the mixture was heated to 70° C. and continued to react for 2.5 h; trichloromethane was removed under reduce pressure to get disulfide-containing diisocyanate.

3) Synthesis of Linear Chain-Extended Polydimethylsiloxane

By mass, at 25° C., 100 g α,ω-aminopropyl terminated polydimethylsiloxane (PDMS, $M_n$=1000), 13.4 g hexamethylene diisocyanate and 1100 g trichloromethane were mixed homogeneously; the mixture was heated to 70° C. and continued to react for 2.5 h; trichloromethane was removed under reduced pressure to get linear chain-extended polydimethylsiloxane.

4) Synthesis of Scrollable And Foldable Transparent Polysiloxane Films

By mass, at 25° C., 50 g linear chain-extended polydimethylsiloxane, 4 g multi-amino terminated hyperbranched polysiloxane, 12 g disulfide-containing diisocyanate and 125 g trichloromethane were mixed homogeneously and poured into a mould. After drying, scrollable and foldable transparent polysiloxane films were obtained.

5) Self-Healing Method of Scrollable And Foldable Transparent Polysiloxane Films Fractured surfaces of damaged scrollable and foldable transparent polysiloxane films were brought into contact, held tightly by clamps, and maintained at 110° C. for 0.6 h to fulfill the self-healing process.

Example 3

1) Synthesis of Multi-Amino Terminated Hyperbranched Polysiloxane (HPSi)

By mass, at 30° C., 100 g γ-aminopropyltriethoxysilane (KH550), 15 g water and 200 g n-propanol were mixed homogeneously; the mixture was heated to 80° C. and continued to react for 6 h; n-propanol was removed under reduced pressure to get multi-amino terminated hyperbranched polysiloxane (HPSi).

2) Synthesis of Disulfide-Containing Diisocyanate

By mass, at 30° C., 77 g 2-hydroxyethyl disulfide, 264 g 4,4'-dicyclohexylmethane diisocyanate and 1200 g 1,2-dichloroethane were mixed homogeneously; the mixture was heated to 80° C. and continued to react for 3 h; 1,2-dichloroethane was removed under reduce pressure to get disulfide-containing diisocyanate.

3) Synthesis of Linear Chain-Extended Polydimethylsiloxane

By mass, at 30° C., 100 g α,ω-aminopropyl terminated polydimethylsiloxane (PDMS, $M_n$=1000), 20.8 g 4,4'-dicyclohexylmethane diisocyanate and 1200 g 1,2-dichloroethane were mixed homogeneously; the mixture was heated to 80° C. and continued to react for 3 h; 1,2-dichloroethane was removed under reduced pressure to get linear chain-extended polydimethylsiloxane.

4) Synthesis of Scrollable And Foldable Transparent Polysiloxane Films

By mass, at 30° C., 50 g linear chain-extended polydimethylsiloxane, 5 g multi-amino terminated hyperbranched polysiloxane, 15 g disulfide-containing diisocyanate and 150 g 1,2-dichloroethane were mixed homogeneously and poured into a mould. After drying, scrollable and foldable transparent polysiloxane films were obtained.

5) Self-Healing Method of Scrollable And Foldable Transparent Polysiloxane Films Fractured surfaces of damaged scrollable and foldable transparent polysiloxane films were brought into contact, held tightly by clamps, and maintained at 115° C. for 0.7 h to fulfill the self-healing process.

Example 4

1) Synthesis of Multi-Amino Terminated Hyperbranched Polysiloxane (HPSi)

By mass, at 22° C., 100 g γ-aminopropyltriethoxysilane (KH550), 11 g water, 100 g methanol and 100 g ethanol were mixed homogeneously; the mixture was heated to 65° C. and continued to react for 4.5 h; methanol and ethanol were removed under reduced pressure to get multi-amino terminated hyperbranched polysiloxane (HPSi).

2) Synthesis of Disulfide-Containing Diisocyanate

By mass, at 22° C., 77 g 2-hydroxyethyl disulfide, 125 g 4,4'-diphenylmethane diisocyanate, 106 g 1,5-naphthalene diisocyanate, 600 g dichloromethane and 700 g trichloromethane were mixed homogeneously; the mixture was heated to 65° C. and continued to react for 3.5 h; dichloromethane and trichloromethane were removed under reduce pressure to get disulfide-containing diisocyanate.

3) Synthesis of Linear Chain-Extended Polydimethylsiloxane

By mass, at 22° C., 100 g α,ω-aminopropyl terminated polydimethylsiloxane (PDMS, $M_n$=1000), 10 g 4,4'-diphenylmethane diisocyanate, 8.4 g 1,5-naphthalene diisocyanate, 600 g dichloromethane and 700 g trichloromethane were mixed homogeneously; the mixture was heated to 65° C. and continued to react for 3.5 h; dichloromethane and trichloromethane were removed under reduced pressure to get linear chain-extended polydimethylsiloxane.

4) Synthesis of Scrollable And Foldable Transparent Polysiloxane Films

By mass, at 22° C., 50 g linear chain-extended polydimethylsiloxane, 6 g multi-amino terminated hyperbranched polysiloxane, 11 g disulfide-containing diisocyanate, 60 g dichloromethane and 60 g trichloromethane were mixed homogeneously and poured into a mould. After drying, scrollable and foldable transparent polysiloxane films were obtained.

5) Self-Healing Method of Scrollable And Foldable Transparent Polysiloxane Films Fractured surfaces of damaged scrollable and foldable transparent polysiloxane films were brought into contact, held tightly by clamps, and maintained at 120° C. for 0.8 h to fulfill the self-healing process.

The invention claimed is:

1. A method for preparing a scrollable and foldable transparent polysiloxane film, comprising:
   (1) γ-aminopropyltriethoxysilane, water and alcohol solvent are mixed and reacted to afford multi-amino terminated hyperbranched polysiloxane;
   (2) 2-hydroxyethyl disulfide, diisocyanate and an alkane chloride are mixed and reacted to afford disulfide-containing diisocyanate;
   (3) α,ω-aminopropyl terminated polydimethylsiloxane, diisocyanate and alkane chloride are mixed and reacted to afford linear chain-extended polydimethylsiloxane; and
   (4) mixing the linear chain-extended polydimethylsiloxane, the multi-amino terminated hyperbranched polysiloxane, the disulfide-containing diisocyanate and an alkane chloride, followed by pouring the mixture into a mold, followed by drying, to afford the scrollable and foldable transparent polysiloxane film.

2. The method according to claim 1, wherein, the alcohol solvent is selected from the group consisting of methanol, ethanol, n-propanol, isopropanol, n-butanol, isobutanol, and any combination thereof; the alkane chloride is selected from the group consisting of dichloromethane, trichloromethane, 1,2-dichloroethane, and any combination thereof; the diisocyanate is selected from the group consisting of diisocyanate compounds and any derivatives prepared from the diisocyanate compounds; the diisocyanate compounds are selected from the group consisting of 2,4-tolylene diisocyanate (TDI), isophorone diisocyanate (IPDI), 4,4'-diphenylmethane diisocyanate (MDI), 4,4'-dicyclohexylmethane diisocyanate (HMDI), hexamethylene diisocyanate (HDI), lysine diisocyanate (LDI), xylylene diisocyanate (XDI), 1,5-naphthalene diisocyanate (NDI), 1,3-bis(1-isocyanato-1-methylethyl)benzene (TMXDI), 4-methylcyclohexyl diisocyanate (HTDI), and any combination thereof.

3. The method according to claim 1, wherein, the mass ratio of γ-aminopropyltriethoxysilane, water and alcohol solvent in Step (1) is 100:(10 to 15):(100 to 200); the mass ratio of 2-hydroxyethyl disulfide, diisocyanate and alkane chloride in Step (2) is (75 to 80):(160 to 270):(1000 to 1500); the mass ratio of α,ω-aminopropyl terminated polydimethylsiloxane, diisocyanate and alkane chloride in Step (3) is 100:(10 to 25):(1000 to 1500); and the mass ratio of linear chain-extended polydimethylsiloxane, multi-amino terminated hyperbranched polysiloxane, disulfide-containing diisocyanate and alkane chloride in Step (4) is 50:(3 to 6):(10 to 15):(100 to 150).

4. The method according to claim 1, wherein, in Step (1), the mixture temperature is room temperature and the reaction temperature is 60 to 80° C. and the reaction time is 4 to 6 h; in Step (2), the mixture temperature is room temperature and the reaction temperature is 60 to 80° C. and the reaction time is 2 to 4 h; in Step (3), the mixture temperature is room temperature and the reaction temperature is 60 to 80° C. and the reaction time is 4 to 6 h; in Step (4), the mixture temperature is room temperature.

5. The method according to claim 1, wherein, in Step (1), multi-amino terminated hyperbranched polysiloxane is obtained by removing solvents under reduced pressure after the reaction is complete; in Step (2), disulfide-containing diisocyanate is obtained by removing solvents under reduced pressure after the reaction is complete; in Step (3), linear chain-extended polydimethylsiloxane is obtained by removing solvents under reduced pressure after the reaction is complete.

6. The scrollable and foldable transparent polysiloxane film prepared by the method described in claim 1.

7. A method of self-healing a damaged scrollable and foldable transparent polysiloxane film, comprising the following steps: fractured surfaces of the damaged scrollable and foldable transparent polysiloxane film are brought into contact and maintained at 100 to 140° C. for 0.5 to 2 h to undergo a self-healing process, wherein the scrollable and foldable transparent polysiloxane film is prepared by a method comprising the following steps:
   (1) γ-aminopropyltriethoxysilane, water and alcohol solvent are mixed and reacted to afford multi-amino terminated hyperbranched polysiloxane,
   (2) 2-hydroxyethyl disulfide, diisocyanate and an alkane chloride are mixed and reacted to afford disulfide-containing diisocyanate,
   (3) α,ω-aminopropyl terminated polydimethylsiloxane, diisocyanate and alkane chloride are mixed and reacted to afford linear chain-extended polydimethylsiloxane,
   (4) mixing the linear chain-extended polydimethylsiloxane, the multi-amino terminated hyperbranched polysiloxane, the disulfide-containing diisocyanate and an alkane chloride, followed by pouring the mixture into a mold, followed by drying, to afford a scrollable and foldable transparent polysiloxane film.

8. The method according to claim 7, wherein the damage refers to fracture.

9. The method according to claim 7, wherein, the alcohol solvent is selected from the group consisting of methanol, ethanol, n-propanol, isopropanol, n-butanol, isobutanol, and any combination thereof; the alkane chloride is selected from the group consisting of dichloromethane, trichloromethane, 1,2-dichloroethane, and any combination thereof; the diisocyanate is selected from the group consisting of diisocyanate compounds and any derivatives prepared from the diisocyanate compounds; the diisocyanate compounds are selected from the group consisting of 2,4-tolylene diisocyanate (TDI), isophorone diisocyanate (IPDI), 4,4'-diphenylmethane diisocyanate (MDI), 4,4'-dicyclohexylmethane diisocyanate (HMDI), hexamethylene diisocyanate (HDI), lysine diisocyanate (LDI), xylylene diisocyanate (XDI), 1,5-naphthalene diisocyanate (NDI), 1,3-bis(1-isocyanato-1-methylethyl)benzene (TMXDI), 4-methylcyclohexyl diisocyanate (HTDI), and any combination thereof.

10. The method according to claim 7, wherein, the mass ratio of γ-aminopropyltriethoxysilane, water and alcohol solvent in Step (1) is 100:(10 to 15):(100 to 200); the mass ratio of 2-hydroxyethyl disulfide, diisocyanate and alkane chloride in Step (2) is (75 to 80):(160 to 270):(1000 to 1500); the mass ratio of α,ω-aminopropyl terminated polydimethylsiloxane, diisocyanate and alkane chloride in Step (3) is 100:(10 to 25):(1000 to 1500); and the mass ratio of linear chain-extended polydimethylsiloxane, multi-amino terminated hyperbranched polysiloxane, disulfide-containing diisocyanate and alkane chloride in Step (4) is 50:(3 to 6):(10 to 15):(100 to 150).

11. The method according to claim 7, wherein, in Step (1), the mixture temperature is room temperature and the reaction temperature is 60 to 80° C. and the reaction time is 4 to 6 h; in Step (2), the mixture temperature is room temperature and the reaction temperature is 60 to 80° C. and the reaction time is 2 to 4 h; in Step (3), the mixture temperature is room temperature and the reaction temperature is 60 to 80° C. and the reaction time is 4 to 6 h; in Step (4), the mixture temperature is room temperature.

12. The method according to claim 7, wherein, in Step (1), multi-amino terminated hyperbranched polysiloxane is obtained by removing solvents under reduced pressure after the reaction is complete; in Step (2), disulfide-containing diisocyanate is obtained by removing solvents under reduced pressure after the reaction is complete; in Step (3), linear chain-extended polydimethylsiloxane is obtained by removing solvents under reduced pressure after the reaction is complete.

* * * * *